July 29, 1924.

E. T. CRAIG ET AL

TRACTOR WHEEL TREAD

Filed Jan. 13, 1922

1,502,752

Emmett Thomas Craig
Clarence Frederick Sills
INVENTORS

BY
J. H. Weatherford
ATTORNEY

Patented July 29, 1924.

1,502,752

UNITED STATES PATENT OFFICE.

EMMETT THOMAS CRAIG AND CLARENCE FREDRICK SILLS, OF MEMPHIS, TENNESSEE.

TRACTOR-WHEEL TREAD.

Application filed January 13, 1922. Serial No. 529,084.

*To all whom it may concern:*

Be it known that we, EMMETT THOMAS CRAIG and CLARENCE FREDRICK SILLS, both citizens of the United States, residing at Memphis, county of Shelby, and State of Tennessee, have invented certain new and useful Improvements in Tractor-Wheel Treads, of which the following is a full, clear, and exact description, such as will enable anyone skilled in the art to make and use the same.

The object of our invention is to provide means of filling the spaces between the transverse cleats used on the rear wheels of tractors, so that a smooth tread may be had without the need of removing the cleats or the need of substituting wheels with smooth tread tires, where it is necessary to use the tractor on a hard surface or other pavement which would be damaged by the cleats.

We accomplish this object by providing fillers to lie between the tractor cleats with proper means for attaching or detaching the same, in order that we may be able to quickly attach or detach the filler blocks and make a smooth tread or a tread with cleats as may be desired. The method of accomplishing this object is more clearly hereinafter shown in the drawings, specifications and claims which form a part hereof.

Figure 2:
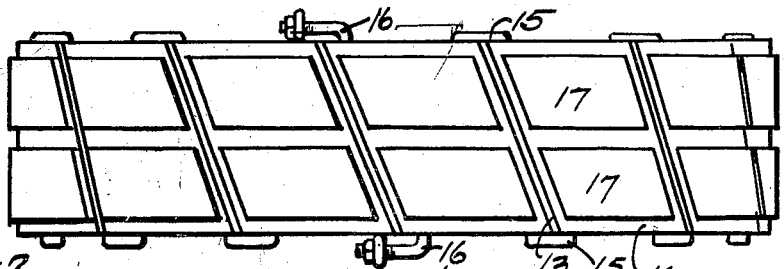
Fig. 2, is a view looking down on the wheel with the filler blocks in place.
Figure 1:
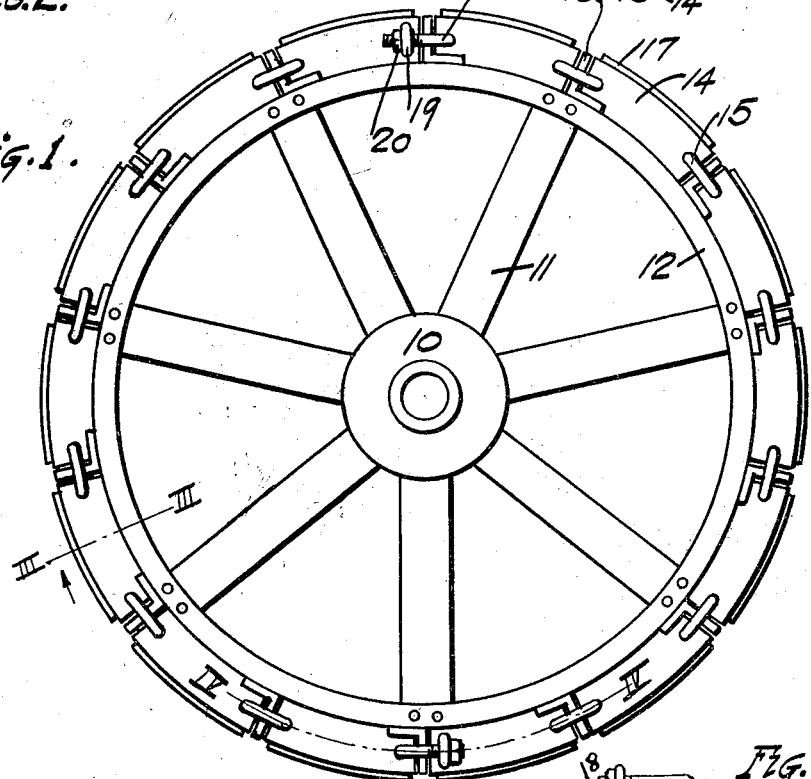
Fig. 1, is a side view of a tractor wheel having angle iron cleats projecting therefrom showing our improved filler blocks in place.

Referring now to the drawings, in which the various parts are indicated by the same numerals in all the views, 10 is the hub of the tractor wheel. 11 the spokes, and 12 the rim of the wheel. 13 are flanges or cleats extending radially from the surface of the rim 12 of the wheels and preferably permanently attached thereto in the usual or any desired manner.

Between these cleats are disposed pads or fillers each composed of a flanged metal retainer 14 adapted to surround and retain a filler block or tread 17 of rubber, wood or other material which block protudes beyond the peripheral edge of the retainer in order that the filler blocks only may come in contact with the surface of the road bed and thereby provide a resilent tread. Each retainer 14 is coupled to the adjoining retainer preferably by U shaped bolts 15 which act as hinges, the legs of the U shaped bolts projecting through holes in the retainers near their adjacent ends, and being held in place by nuts 21, or by riveting if it be so desired. The complete tread is preferably made up of two series of coupled sections, ordinarily each having an equal number of sections so hinged together. These two series of pads are preferably connected together by L shaped bolts 16, the short legs of which bolts are inserted through holes in the end retainers of the series. Through the holes in the opposite end of such retainer an "eye" bolt 19 is inserted. In putting these rims on the wheel, each series of coupled section is put in place and the bolts 16 of one section are passed through the eye bolts 19 of the adjacent section and the nuts 20 tightened. The corresponding bolts 16 of the opposite section are likewise connected up and tightened. This is then repeated on the diametrically opposite side of the wheel and the later is ready for use on smooth streets.

To remove the sections the nuts 21 are removed and the sections thereby released.

It will of course be evident that all the sections may be coupled in one series and a single pair of bolts 16 be used to couple them in place. And it is also evident that the sections may be coupled each to the other and the series of sections thus coupled may be connected up in some other manner than the bolts shown without departing from the spirit of our invention.

Figure 3:
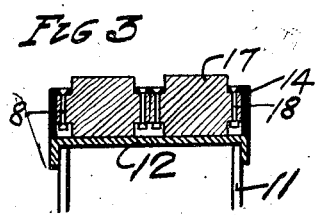
Fig. 3, is a transverse section through the rim of the wheel and through one set of filler blocks on the line III—III of Fig. 1.
Figure 4:
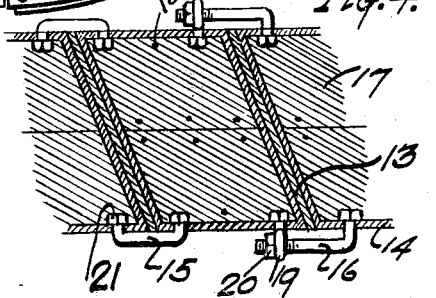
Fig. 4, is a section on the line IV—IV of Fig. 1 looking in the direction of the arrow, showing the means for connecting adjacent filler blocks together and the means for connecting the two sets of filler blocks each of which cover preferably one-half of the wheel whereby they may be readily placed on, or removed from the wheels.

It is the intention that the retainers 14 shall fit down snugly against the rim of the wheel and hold the filler blocks 17 in place, but these latter are preferably secured by means of bolts 18 as disclosed in the sectional view Fig. 3. In the views we have shown the filler blocks arranged transversely across the tread of the wheel in pairs. It is of course evident that where the wheels are of excessive width, three of these fillers may be placed side by side or if the wheel is a narrow one, that a single block may be used instead of the two shown.

The pads or fillers 17 are preferably symmetrical in shape as shown in Fig. 3, so that when the outer surface becomes worn, they may be reversed and the former inner surface be used as a wearing surface. This will be possible only of course where these pads are made of flexible material such as rubber.

Having now fully described our invention, what we claim and desire to secure by Letters Patent in the United States is:—

1. In a vehicle wheel, the combination with the rim thereof, and transverse flanges projecting from said rim, of a temporary tread member comprising two series of sections hinged together, adapted to be detachably engaged directly with said rim and disposed between said flanges.

2. In a vehicle wheel, the combination with the rim thereof, and transverse flanges projecting from said rim, of a temporary tread member comprising a plurality of sections hinged together, adapted to be detachably engaged directly with said rim and disposed between said flanges, each section comprising a metal retainer and resilient treads secured by and projecting beyond said retainer.

3. In a vehicle wheel, the combination with the rim thereof and transverse flanges projecting from said rim, of a temporary tread member comprising two series of sections adapted to be detachably engaged directly with said rim and disposed between said flanges, each series comprising metal retainers, resilient treads secured by and projecting beyond said metal retainers, U bolts hinging said retainers together, and L shaped bolts detachably connecting the end retainers of the two series.

4. In a vehicle wheel, the combination with the rim thereof, and transverse flanges projecting from said rim, of a temporary tread member comprising a plurality of sections hinged together adapted to be detachably engaged directly with said rim and disposed between said flanges, each section comprising a metal retainer and reversible resilient treads secured by and projecting beyond said retainers.

5. In a vehicle wheel, the combination with the rim thereof and transverse flanges projecting from said rim, of a temporary tread member comprising two series of sections adapted to be detachably engaged directly with said rim and disposed between said flanges, each series comprising metal retainers, resilient treads secured by and projecting beyond said metal retainers, means for hinging said retainers together, and means for detachably connecting the end retainers of the two series.

6. In a vehicle wheel, the combination with the rim thereof, and transverse flanges projecting from said rim, of a temporary tread member comprising sections hinged together in series and adapted to be detachably engaged directly with said rim and disposed with one of said sections between each pair of said flanges, each section comprising a metal retainer and resilient tread secured by and projecting beyond said retainer.

CLARENCE FREDRICK SILLS.
EMMETT THOMAS CRAIG.